US012564745B2

(12) United States Patent
Yamazaki et al.

(10) Patent No.: US 12,564,745 B2
(45) Date of Patent: Mar. 3, 2026

(54) FIRE STOPPER

(71) Applicant: TOPPAN INC., Tokyo (JP)

(72) Inventors: Tsukasa Yamazaki, Tokyo (JP); Ryo Shoda, Tokyo (JP); Junya Tanabe, Tokyo (JP); Ryohei Tode, Tokyo (JP)

(73) Assignee: TOPPAN INC., Tokyo (JP)

( * ) Notice: Subject to any disclaimer, the term of this patent is extended or adjusted under 35 U.S.C. 154(b) by 555 days.

(21) Appl. No.: 17/868,981

(22) Filed: Jul. 20, 2022

(65) Prior Publication Data

US 2022/0355144 A1     Nov. 10, 2022

Related U.S. Application Data

(63) Continuation of application No. PCT/JP2021/002090, filed on Jan. 21, 2021.

(30) Foreign Application Priority Data

Jan. 24, 2020     (JP) ................................ 2020-010064
Nov. 2, 2020     (JP) ................................ 2020-183602

(51) Int. Cl.
| | |
|---|---|
| *A62C 35/10* | (2006.01) |
| *B32B 7/12* | (2006.01) |
| *B32B 27/08* | (2006.01) |
| *B32B 27/20* | (2006.01) |
| *B32B 27/30* | (2006.01) |
| *B32B 27/32* | (2006.01) |

(52) U.S. Cl.
CPC ................ *A62C 35/10* (2013.01); *B32B 7/12* (2013.01); *B32B 27/08* (2013.01); *B32B 27/20* (2013.01); *B32B 27/304* (2013.01); *B32B 27/32* (2013.01); *B32B 2307/3065* (2013.01); *B32B 2307/7246* (2013.01); *B32B 2457/10* (2013.01)

(58) Field of Classification Search
None
See application file for complete search history.

(56) References Cited

U.S. PATENT DOCUMENTS

| | | | | |
|---|---|---|---|---|
| 2008/0053342 A1 * | 3/2008 | Muirhead | .......... | B65D 19/0012 |
| | | | | 108/57.25 |
| 2011/0039151 A1 | 2/2011 | Mitchell | | |
| 2011/0256382 A1 | 10/2011 | Jung | | |
| 2013/0029064 A1 | 1/2013 | Kariya | | |
| 2014/0217092 A1 | 8/2014 | Kawka et al. | | |
| 2018/0072922 A1 | 3/2018 | Canale | | |
| 2019/0046822 A1 | 2/2019 | Iwasaki et al. | | |
| 2020/0377690 A1 | 12/2020 | Ootsuki et al. | | |

FOREIGN PATENT DOCUMENTS

| | | |
|---|---|---|
| CN | 107019861 A | 8/2017 |
| CN | 206419616 U | 8/2017 |
| CN | 107571556 A | 1/2018 |
| CN | 108578945 A | 9/2018 |
| CN | 108992831 A | 12/2018 |
| EP | 2 541 104 A2 | 1/2013 |
| EP | 2 674 464 A1 | 12/2013 |
| EP | 2 749 618 A1 | 7/2014 |
| JP | S50-116993 A | 9/1975 |
| JP | 05-084873 A | 4/1993 |
| JP | H08-045794 A | 2/1996 |
| JP | 09-276440 A | 10/1997 |
| JP | H10-201871 A | 8/1998 |
| JP | 2005-042414 A | 2/2005 |
| JP | 2009-113434 A | 5/2009 |
| JP | 2010-527103 A | 8/2010 |
| JP | 2014-121817 A | 7/2014 |
| JP | 2014-212893 A | 11/2014 |
| JP | 2015-006302 A | 1/2015 |
| JP | 2017-080023 A | 5/2017 |
| JP | 2018-170232 A | 11/2018 |
| JP | 2019-127005 A | 8/2019 |
| JP | 2020-205240 A | 12/2020 |
| KR | 101756229 B1 | 7/2017 |
| KR | 20170083510 A | 7/2017 |
| WO | WO-2014/069022 A1 | 5/2014 |
| WO | WO-2018/012503 A1 | 1/2018 |
| WO | WO-2019/087116 A2 | 5/2019 |
| WO | WO-2019/095249 A1 | 5/2019 |
| WO | WO-2019/163841 A1 | 8/2019 |
| WO | WO-2020/013373 A1 | 1/2020 |

OTHER PUBLICATIONS

Extended European Search Report issued in corresponding European Patent Application No. 21743760.7, dated Jun. 15, 2023.
International Searching Authority, "International Search Report," issued in connection with International Patent Application No. PCT/JP2021002090, dated Apr. 6, 2021, 6 pages.
International Searching Authority, "Written Opinion," issued in connection with International Patent Application No. PCT/JP2021/002090, dated Apr. 6, 2021, 3 pages.
Office Action issued in corresponding Chinese Patent Application No. 202180009825.8 dated Dec. 27, 2023 (18 pages).
Office Action issued in corresponding Japanese Patent Application No. 2021-572799 dated Oct. 24, 2023 (6 pages).
Office Action issued in corresponding Chinese Patent Application No. 202180009825.8, dated Apr. 7, 2023.
Office Action issued in corresponding Japanese Patent Application No. 2021-572799 dated Jan. 23, 2024 (7 pages).
Notice of Opposition issued in corresponding Japanese Patent Opposition No. 2025-700025 dated Mar. 25, 2025.
Office Action issued in corresponding Japanese Patent Application No. 2024-094258 dated Aug. 26, 2025.
Office Action issued in corresponding European Patent Application No. 21743760.7 dated Sep. 26, 2025.
Notice of Opposition issued in corresponding Japanese Patent No. 7505507 dated Oct. 3, 2025.

* cited by examiner

*Primary Examiner* — Sheeba Ahmed
(74) *Attorney, Agent, or Firm* — Foley & Lardner LLP

(57) ABSTRACT

A fire stopper includes a fire extinguishing agent-containing layer and a resin substrate arranged in this order.

17 Claims, 7 Drawing Sheets

FIRE STOPPER

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/002090, filed on Jan. 21, 2021, which in turn claims the benefit of JP 2020-010064, filed Jan. 24, 2020; and JP 2020-183602, filed Nov. 2, 2020 the disclosures of all which are incorporated herein by reference in its entirety.

TECHNICAL FIELD

The present invention relates to a fire stopper.

BACKGROUND

In recent years, our lives have become more convenient with the advancement of technology, which, in return requires an increased amount of energy to create that convenience. A high level of safety is required in handling of energy in situations where large amounts of energy are densely filled and stored, transferred, or used.

Taking automobiles as an example, there is a risk of ignition or fire in cases such as when fossil fuels are mined, when gasoline is refined from fossil fuels, when gasoline is transported, or when gasoline is burned in engines. Further, taking electronics as an example, there is also a risk of ignition or fire in cases such as when electrical energy is transferred through electric wires, when electrical energy is adjusted in a substation or transformer, when electrical energy is used in electrical appliances in homes or factories, or when electrical energy is temporarily stored in storage batteries.

To address the problem of ignition or fire, PTL 1 proposes using a fire extinguishing liquid and a fire extinguisher. PTL 2 proposes an automatic fire extinguishing device designed for the purpose of being dropped from a helicopter. PTL 3 proposes an aerosol fire extinguishing device.

[Citation List] [Patent Literature] [PTL 1] JP H9-276440 A; [PTL 2] JP 2015-6302 A; [PTL 3]; JP 2017-080023 A.

SUMMARY OF THE INVENTION

Technical Problem

All prior art proposes a way to deal with fires after a certain amount of time has elapsed. However, the preferable method to minimize the damage caused by fire is to carry out some kind of fire extinguishing operation (initial fire extinguishing) soon after ignition.

Therefore, for example, a method is considered in which the components of a fire extinguishing agent disclosed in the prior art is provided in advance in the vicinity of an object which is likely to ignite. Thus, it is expected that the fire will be extinguished by the components of the fire extinguishing agent before a human senses that the object has been ignited. However, it is necessary to deal with the problem that a fire extinguishing agent arranged in an open space deteriorates over time. Additionally, it is not realistic to spray the fire extinguishing agent in the vicinity of the object before the ignition, and it is necessary to provide the fire extinguishing agent in the vicinity of the object in a suitable form that is easy to handle.

The present invention has been made in view of the above circumstances, and has an object to provide a fire stopper that is improved or even excellent in handleability, improved or even excellent in property stability of the fire extinguishing agent, and that can better prevent the occurrence or spread of a fire.

Solution to Problem

One aspect of the present invention provides a fire stopper including a fire extinguishing agent-containing layer and a resin substrate arranged in this order. In the case of such a fire stopper, the handleability is secured by the resin substrate. When the fire stopper is provided so that the fire extinguishing agent-containing layer side faces the object, the resin substrate functions as a sealant, so that the deterioration of the fire extinguishing agent is suppressed. Such a fire stopper is improved or even excellent in handleability and property stability of a fire extinguishing agent. Further, the provision of the fire stopper in the vicinity of the object in advance enables initial fire extinguishing to be performed, which contributes to prevention of the fire from spreading to the surrounding area.

In the fire stopper of the present invention, the fire extinguishing agent-containing layer may contain a fire extinguishing agent and a resin.

The fire stopper of the present invention includes the resin substrate comprising at least one selected from a group consisting of polyolefin, polyester, fluororesin, PVC, PVA, acrylic resin, epoxy resin, polyamide, and polyimide.

In the fire stopper of the present invention, the thickness of the resin substrate may be of 4.5 to 1000 μm.

In the fire stopper of the present invention, a water vapor permeability of the resin substrate (under conditions of 40° C./90% RH according to JIS K 7129) may be $2 \times 10^2$ g/m²/day or less.

The fire stopper of the present invention may further include an additional resin substrate below the fire extinguishing agent-containing layer. Thus, deterioration of the fire extinguishing agent can be prevented regardless of the material of the surface of the object. The fire stopper of the present invention may further include a design layer on at least one surface of the additional resin substrate described above.

The fire stopper according to the present invention further includes an adhesive layer at least one of between the fire extinguishing agent-containing layer and the resin substrate, and between the fire extinguishing agent-containing layer and the additional resin substrate. The fire stopper of the present invention may further include a sticky layer or an adhesive layer on the outer surface of the resin substrate and/or the additional resin substrate.

Advantageous Effects of the Invention

The present invention provides a fire stopper that is improved or even excellent in handleability and property stability of the fire extinguishing agent, and that can prevent the outbreak and spread of fire. The advantages of the present invention are briefly summarized below.

Damage caused by the spread of flames can be minimized. That is, initial fire extinguishing is possible.

After a person confirms the occurrence of a fire, there is no need to carry the fire extinguisher near the target and carry out fire extinguishing activities.

Since a fire stopper can be installed more easily than installing equipment such as automatic fire extinguishing devices, places for installing the fire stopper are not limited and it can be customized according to the places required.

Since the property stability of the fire extinguishing agent is improved or even excellent, the frequency of replacing the fire stopper can be reduced.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

<Fire Stopper>

Figure 1:
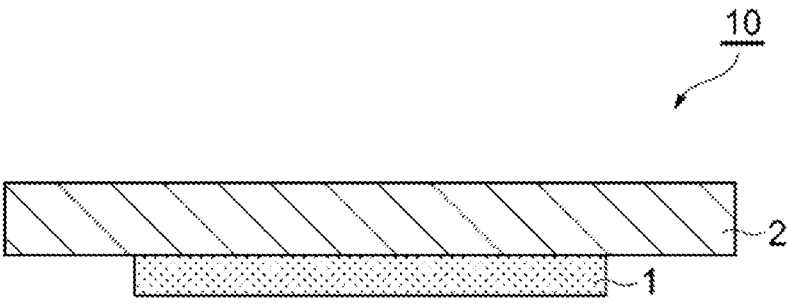
FIG. 1 is a schematic cross-sectional view of a fire stopper according to an embodiment.

FIG. 1 is a schematic cross-sectional view of a fire stopper according to an embodiment. A fire stopper 10 includes a fire extinguishing agent-containing layer 1 and a resin substrate 2 arranged in this order. The fire stopper may be in the form of a sheet. FIG. 1 illustrates the fire extinguishing agent-containing layer 1 being provided on at least a part of the lower surface of the resin substrate 2, however, the fire extinguishing agent-containing layer 1 may be provided on the entire surface of the lower surface of the resin substrate 2. That is, the end face of the fire extinguishing agent-containing layer 1 and the end face of the resin substrate 2 may be flush with each other.

Figure 2:
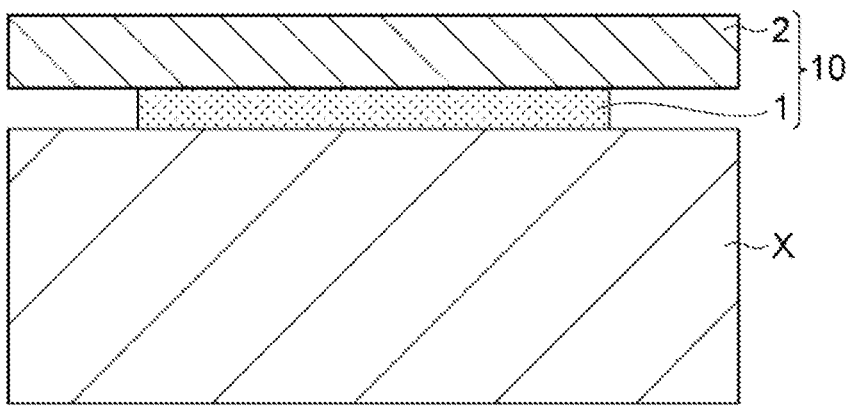
FIG. 2 is a schematic cross-sectional view which illustrates a method of how to use the fire stopper.

FIG. 2 is a schematic cross-sectional view which illustrates a method of how to use the fire stopper. As shown in FIG. 2, the fire stopper 10 is used so that the fire extinguishing agent-containing layer 1 side of the fire stopper (or the additional resin substrate side if the fire stopper is provided with an additional resin substrate as described below) faces the object X which is likely to ignite. When the object X ignites, initial extinguishing will be carried out by the fire stopper provided in advance.

Figure 3:
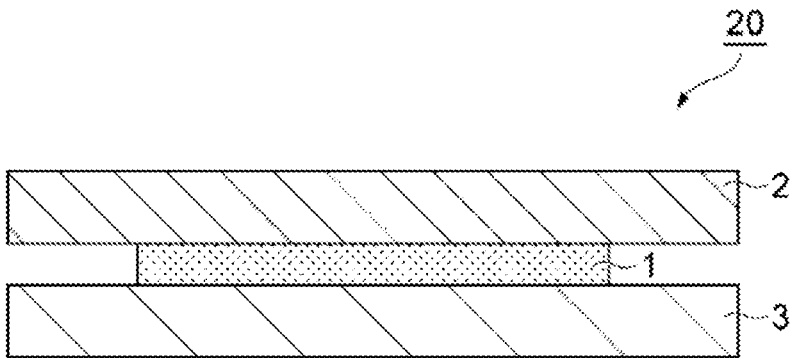
FIG. 3 is a schematic cross-sectional view of a fire stopper according to another embodiment.
Figure 4:
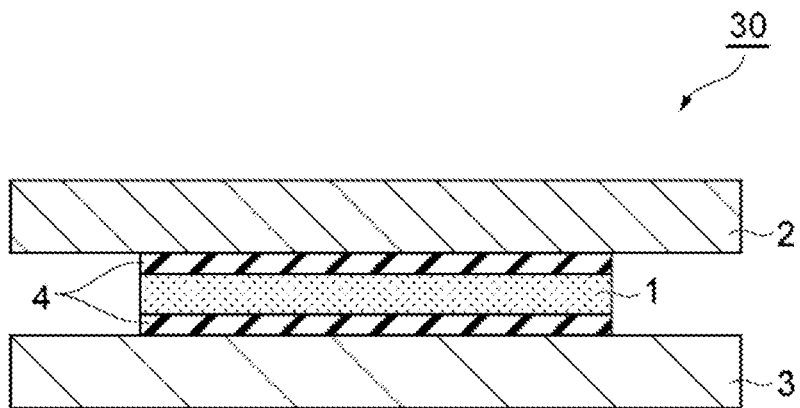
FIG. 4 is a schematic cross-sectional view of a fire stopper according to another embodiment.
Figure 5:
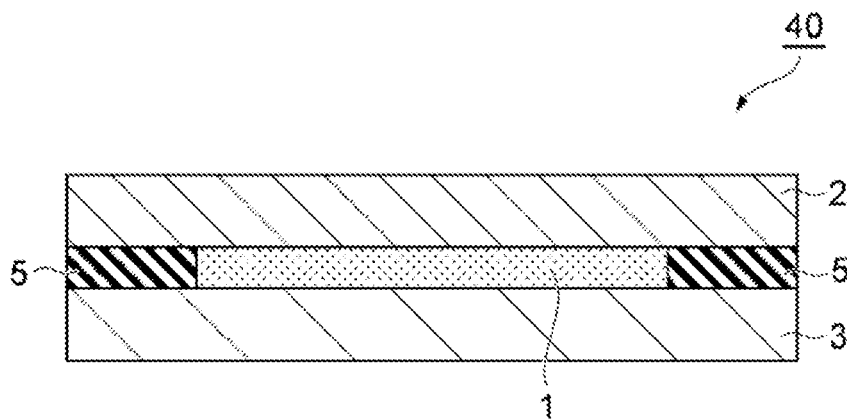
FIG. 5 is a schematic cross-sectional view of a fire stopper according to another embodiment.
Figure 6:
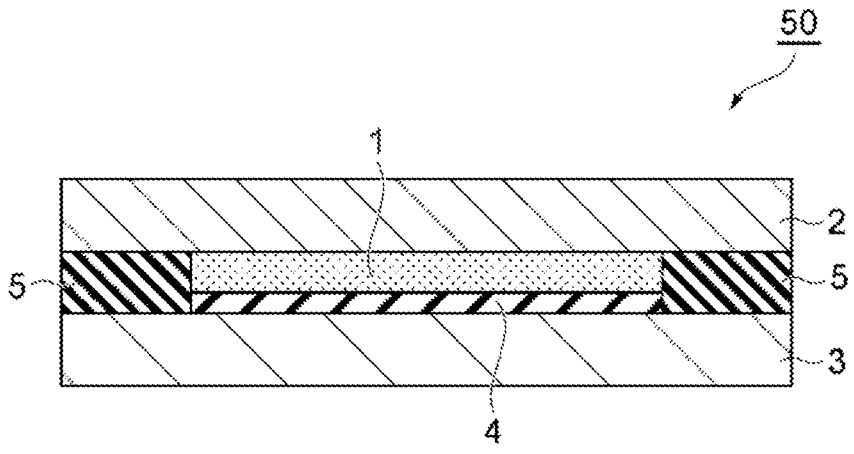
FIG. 6 is a schematic cross-sectional view of a fire stopper according to another embodiment.

FIG. 3 is a schematic cross-sectional view of a fire stopper according to another embodiment. The fire stopper 20 includes an additional resin substrate 3, a fire extinguishing agent-containing layer 1, and a resin substrate 2 arranged in this order. FIG. 4 is a schematic cross-sectional view of a fire stopper according to another embodiment. The fire stopper 30 includes an additional resin substrate 3, a fire extinguishing agent-containing layer 1, and a resin substrate 2 arranged in this order. The fire stopper 30 further includes an adhesive layer 4 between the resin substrate 2 and the fire extinguishing agent-containing layer 1, and an adhesive layer 4 between the additional resin substrate 3 and the fire extinguishing agent-containing layer 1. FIG. 5 is a schematic cross-sectional view of a fire stopper according to another embodiment. The fire stopper 40 includes an additional resin substrate 3, a fire extinguishing agent-containing layer 1, and a resin substrate 2 arranged in this order. The peripheral edges of the resin substrate 2 and the additional resin substrate 3 are joined to each other by sealing portions 5. FIG. 6 is a schematic cross-sectional view of a fire stopper according to another embodiment. The fire stopper 50 includes an additional resin substrate 3, an adhesive layer 4, a fire extinguishing agent-containing layer 1, and a resin substrate 2 arranged in this order. The peripheral edges of the resin substrate 2 and the additional resin substrate 3 are joined to each other by sealing portions 5.

The thickness of the fire stopper is not necessarily limited, as it varies depending on the layer configuration. However, since the fire stopper can be made thin for saving installation space while maintaining the performance of the fire stopper, the thickness thereof may be, for example, 0.1 to 20 mm. The area of the main surface of the fire stopper (the surface of the fire stopper when viewed from perpendicular to the top of the fire stopper) may be, for example, 9 to 620 cm$^2$ from the viewpoint of fire stopping performance and handleability of the fire stopper.

(Resin Substrate)

The substrate may be made from a resin substrate. Examples of the material for the resin substrate include polyolefin (LLDPE, LDPE, PP, COP, CPP, etc.), polyester (PET, etc.), fluororesin (PTFE, ETFE, EFEP, PFA, FEP, PCTFE, etc.), PVC, PVA, acrylic resin, epoxy resin, polyamide, and polyimide. Of these, from the viewpoint of low water vapor permeability and ease of suppressing deterioration of the fire extinguishing agent, the resin substrate may contain at least one kind selected from the group consisting of LLDPE, PP, COP, CPP, PET, PTFE, ETFE, EFEP, PFA, FEP, PCTFE and PVC. Additionally, using a transparent material makes it easier to inspect the appearance of the fire stopper and to check when to replace the fire stopper with a newer one. The resin substrate may contain a fire extinguishing agent which will be described later.

The resin substrate may be composed of one or more resin layers. The material of each layer may be the same or different from each other. When the resin substrate is composed of two or more resin layers, one of the resin layers may be a fire extinguishing agent support layer for supporting the fire extinguishing agent. Pre-forming the fire extinguishing agent on the fire extinguishing agent support layer facilitates handling of the fire extinguishing agent.

The thickness and breaking strength of the resin substrate can be appropriately selected according to the heat quantity, impact, and space allowed at the time of fire outbreak. For example, if the resin substrate is thick, water vapor permeation can be easily prevented, strength and rigidity can be obtained, high flatness can be obtained, and handling can be facilitated. In contrast, if the resin substrate is thin, a fire stopper can be installed even in a narrow space. The thickness of the resin substrate is not limited, and may be, for example, in the range of 4.5 to 1000 μm, or may be in the range of 12 to 100 μm, or alternatively, in the range of 12 to 50 μm. The resin substrate may be a laminate of a plurality of resin substrates.

The resin substrate may be a resin substrate (high-strength heat-resistant resin substrate) having heat resistance and impact resistance. The high-strength heat-resistant substrate preferably satisfies at least one of a tensile strength of 20 N/cm or more and a melting point of 500° C. or higher. The resin substrate may contain a material such as carbon, glass, stainless steel, aluminum, or ceramic, as a reinforcing material, particularly a woven fabric (cloth) of fibers made of these materials. The heat and impact resistance of the resin substrate prevents holes from occurring on the resin substrate side due to heat or impact at the time of ignition. This prevents the fire extinguishing agent from being ejected in the opposite direction to the object.

The resin substrate has water vapor barrier properties to such a degree that the property of the fire extinguishing agent contained in the fire extinguishing agent-containing layer does not change significantly regardless of the installation location or operating environment of the fire stopper. The water vapor permeability of the resin substrate (under conditions of 40° C./90% RH according to JIS K 7129) is not particularly limited since it can be designed according to the type of a fire extinguishing agent, but may be $2\times10^2$ g/m²/day or less and $1\times10^2$ g/m²/day or less. From the viewpoint of adjusting water vapor permeability, the resin substrate may be provided with a vapor deposition layer (alumina vapor deposition layer or silica vapor deposition layer) having water vapor barrier properties.

(Fire Extinguishing Agent-Containing Layer)

Fire extinguishing agents are not particularly limited, and those having the so-called four elements of fire extinguishing (removal, cooling, suffocation, and negative catalytic action) may be used appropriately according to the condition of the object. In addition to general fire extinguishing agents (in addition to powder-based fire extinguishing agents consisting mainly of potassium salts, general powder-based fire extinguishing agents such as sodium hydrogen carbonate and phosphates are mentioned), sand (standard sand) and the like are cited as fire extinguishing agents. ABC fire extinguishing agent is listed as a universal fire extinguishing agent, and BC fire extinguishing agent is listed as a fire extinguishing agent for oil and electrical fires. When the object is a lithium-ion battery, a BC fire extinguishing agent or other fire extinguishing agent for the lithium-ion battery is used.

The fire extinguishing agent-containing layer can be formed by applying a slurry containing a fire extinguishing agent and a binder as described later, or can be formed by kneading the fire extinguishing agent into a resin. That is, the fire extinguishing agent-containing layer may be formed from a layer of a composition containing a fire extinguishing agent and a binder, or a resin layer containing the fire extinguishing agent.

The amount of a fire extinguishing agent may be selected according to the condition of the object, the thermal power at the time of ignition, time for fire to be extinguished, and the space allowed. The larger the amount of the fire extinguishing agent, the better the ability to extinguish the fire and the shorter the time to extinguish the fire. However, since the volume of the fire extinguishing agent may increase, the place where the fire stopper can be placed is limited. The thickness of the fire extinguishing agent-containing layer may be, for example, 30 to 1000 and may be 50 to 500 The content of the fire extinguishing agent contained in the fire extinguishing agent-containing layer may be 70 to 97 mass % based on the total amount of the fire extinguishing agent-containing layer. The fire extinguishing agent-containing layer and the object may be joined by an adhesive layer described later.

(Additional Resin Substrate)

As shown in FIG. 3, the fire stopper may further include an additional resin substrate (sealing substrate) on the fire extinguishing agent. The use of the additional resin substrate allows the fire extinguishing agent to be held more stably regardless of the material of the object X.

Materials for the additional resin substrate include the materials exemplified as the above resin substrate. Melting of the additional resin substrate by the fire from the object X or by the heat generated before the fire starts causes the fire extinguishing agent-containing layer to be exposed. From the viewpoint of having appropriate meltability and water vapor barrier properties, the additional resin substrate is preferably made of polyester (PET, etc.), fluororesin (PTFE, ETFE, EFEP, PFA, FEP, PCTFE, etc.), PVC, etc., but it is not necessarily limited thereto. The thickness of the additional resin substrate is not limited, and may be, for example, in the range of 4.5 to 1000 or may be in the range of 12 to 100 μm, or alternatively, in the range of 12 to 50 μm. The additional resin substrate may contain fire extinguishing agents.

The additional resin substrate has water vapor barrier properties to such a degree that the property of the fire extinguishing agent contained in the fire extinguishing agent-containing layer does not change significantly regardless of the installation location or operating environment of the fire stopper. The water vapor permeability of the additional resin substrate (under conditions of 40° C./90% RH according to JIS K 7129) is not particularly limited since it can be designed according to the type of a fire extinguishing agent, but may be $2\times10^2$ g/m²/day or less, or $1\times10^2$ g/m²/day or less. From the viewpoint of adjusting water vapor permeability, the additional resin substrate may be provided with a vapor deposition layer (alumina vapor deposition layer or silica vapor deposition layer) having water vapor barrier properties.

(Adhesive Layer)

As shown in FIG. 4, the fire stopper may further include adhesive layers. One of the adhesive layers is shown between the resin substrate 2 and the fire extinguishing agent-containing layer 1, and another one is shown between the additional resin substrate 3 and the fire extinguishing agent-containing layer 1. However, the adhesive layer 4 may be provided at least one of between the resin substrate 2 and the fire extinguishing agent-containing layer 1, and between the additional resin substrate 3 and the fire extinguishing agent-containing layer 1. In the figure, the additional resin substrate 3 and the adhesive layer 4 for bonding the additional resin substrate 3 may not be provided. Further, in FIG. 4, the end face of the fire extinguishing agent-containing layer 1 and the end face of the adhesive layer 4 are shown as being flush with each other, but the end faces thereof may not necessarily have to be flush with each other. For example, the adhesive layer 4 may protrude outward from the end face of the fire extinguishing agent-containing layer 1.

The provision of the adhesive layer between the resin substrate and the fire extinguishing agent-containing layer allows the fire extinguishing agent-containing layer to be held stably on the resin substrate. The provision of the adhesive layer between the additional resin substrate and the fire extinguishing agent-containing layer makes it easier to fix the additional resin substrate.

The adhesive layer can be suitably selected according to the type of the resin substrate, the additional resin substrate, and the fire extinguishing agent-containing layer. The adhesive layer may be formed of, for example, a material such as a heat sealing material, an adhesive agent, or a tackifier. The thickness of the adhesive layer may be, for example, 1 to 10 μm, and may be 2 to 5 μm.

(Sealing Portion)

As shown in FIG. 5, the fire stopper may further include sealing portions. That is, the fire stopper may include the sealing portions for bonding the peripheral edges of the resin substrate and the additional resin substrate to each other. The provision of the sealing portions enables bonding of the resin substrate and the additional resin substrate which results in sealing the fire extinguishing agent. Thus, the fire extinguishing agent does not come into contact with the air, and deterioration of the fire extinguishing performance of the fire extinguishing agent can be suppressed. The sealing portions prevent the movement of the fire extinguishing agent, and thus the fire extinguishing agent can be released in the desired direction more easily.

The sealing portion may be formed of the material exemplified by the adhesive layer described above. The peripheral edges of the resin substrate and the additional resin substrate may be bonded to each other using the material exemplified by the adhesive layer described above. For example, as shown in FIG. 6, when the fire stopper includes an adhesive layer between the fire extinguishing agent-containing layer and an additional substrate, the fire extinguishing agent can be sealed with the same material in the adhesive layer and the sealing portions. The sealing portions may be formed from other ultraviolet curable sealing materials. If the resin substrate and/or the additional resin substrate themselves are heat sealable, the sealing portions may be formed by heat sealing the substrates. That is, the sealing portions may be heat sealing portions of the resin substrate and/or the additional resin substrate. If the sealing portions are formed of heat sealing materials, the fire extinguishing agent can be sealed by forming a heat seal material over the entire surface of the additional resin substrate and then heat sealing only the outer perimeter of the fire extinguishing agent. The provision of the sealing portions enables the fire extinguishing agent to be encapsulated without attaching the fire extinguishing agent to the additional substrate.

(Object Likely to Ignite)

The object is not particularly limited as long as it is likely to ignite and has a surface (flat or curved) on which the fire stopper described above can be placed. Examples of such objects include various materials such as electric wires, switchboards, distribution boards, control panels, storage batteries (such as lithium-ion batteries), wallpaper for building materials, building materials such as ceiling materials, boxes for collecting lithium-ion batteries (recycling boxes), trash cans, vehicle-related materials, electrical outlets, and electrical outlet covers.

As shown in FIG. 1, in the case of a fire stopper having a fire extinguishing agent-containing layer and a resin substrate arranged in this order, the surface of the object X is preferably made of a material such as metal or glass having low water vapor permeability. As shown in FIG. 2, in the case of a fire stopper having an additional resin substrate, a fire extinguishing agent-containing layer, and a resin substrate arranged in this order, the surface of the object X does not have to be made of a material having low water vapor permeability.

<Method for Producing Fire Stopper>

As described above, the method of producing the fire stopper is not particularly limited. The fire stopper can be produced by appropriately laminating the respective layers and joining and sealing the periphery of the substrate with a heat seal or an adhesive agent as necessary. The method of providing the fire extinguishing agent—containing layer should be adjusted according to the manner in which it is provided. For example, a slurry containing a fire extinguishing agent and a binder may be applied to a resin substrate to form a fire extinguishing agent-containing layer. Further, the fire extinguishing agent-containing layer can be formed by co-extruding the fire extinguishing agent-impregnated resin with the substrate resin. The fire extinguishing agent-containing layer and the resin substrate may be prepared separately and joined together by lamination. The resin substrate provided with the fire extinguishing agent-containing layer may be a resin layer (one layer among a plurality of layers forming the resin substrate) as a fire extinguishing agent support layer. When the fire stopper is provided with an additional resin substrate, an additional resin substrate provided with a fire extinguishing agent-containing layer may be prepared and bonded to the resin substrate.

While the embodiments of the present invention have been described in detail, it should be understood that the present invention is not limited to the embodiments described above. For example, a sticky layer or an adhesive layer may be provided on the outside of the resin substrate 2 or the additional resin substrate 3 from the viewpoint of more easily installing the fire stopper at a place where there is a likelihood of ignition. A release film may be further provided to cover the sticky layer or the adhesive layer. The release film is removed when the fire stopper is used, and may be made of resin or paper. Depending on the selection or the treatment (for example, stretching or thinning) of the thermoplastic resin which forms the resin substrate 2 and the additional resin substrate 3, the fire stopper may be in the form of a shrink film or a stretch film.

Figure 7:
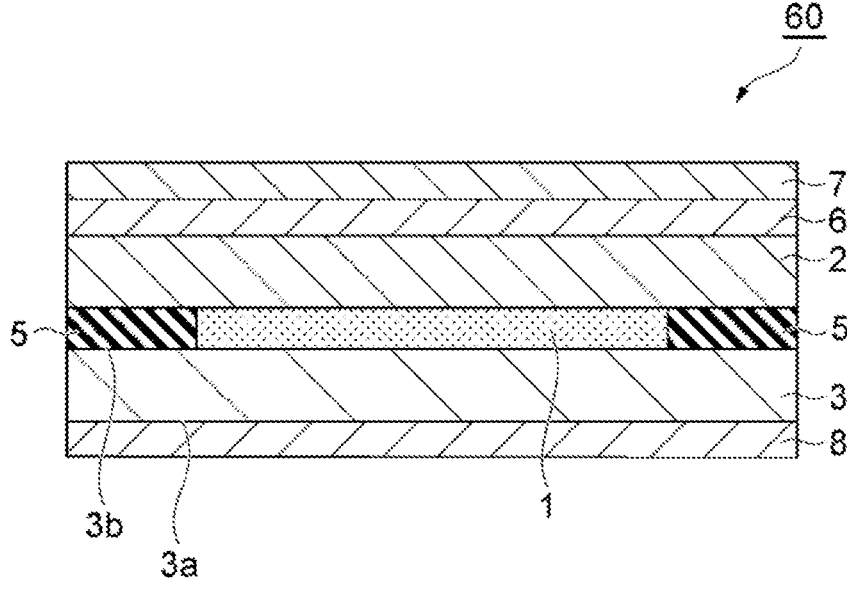
FIG. 7 is a schematic cross-sectional view of a fire stopper according to another embodiment.

The fire stopper may further include a design layer. The design layer may be formed using printing techniques or made of printed characters. Specific examples of designs include wood grain textures intended for living spaces, solid patterns such as tile textures in white and gray tones, as well as pictures, patterns, designs, and text patterns. The provision of a design layer enables the design to be enhanced, enables the fire stopper to blend in with the surrounding environment, and enables the strength of the fire stopper to be increased. FIG. 7 is a cross-sectional view showing an embodiment of a fire stopper including a design layer. The fire stopper 60 shown in FIG. 7 includes a sticky layer 6 (or an adhesive layer) and a release film 7 arranged in this order on the outside surface of the resin substrate 2, and further includes a design layer 8 on the additional resin substrate 3 side. For example, to create a tile texture using a design layer, as shown in FIG. 7, adding the design layer 8 on an outer surface 3*a* of the additional resin substrate 3 is preferred. When the additional resin substrate 3 is transparent, a design layer may be provided on an inner surface 3*b* of the additional resin substrate 3. The design layer may be a single-layer or multilayer structure.

EXAMPLES

While the present invention will be described in more detail using the following examples, it should be understood that the present invention is not limited to the following examples.
<Preparation of Materials>
(Substrate and Additional Substrate)
  PVC film: Thickness 100 μm
  LLDPE film: Thickness 50 μm or 100 μm
  LDPE film: Thickness 25 μm or 50 μm
  Paper: Thickness 250 μm
(Fire Extinguishing Agent>
  Ordinary fire extinguishing agent (manufactured by MORITA MIYATA CORPORATION)
<Formation of Fire Stopper>

Example 1

Materials shown in Table 1 were used to form a fire stopper. A fire extinguishing agent-containing layer was formed by preparing a slurry containing the fire extinguishing agent and a binder, and applying it on a substrate.

Example 2

A fire stopper was produced in a manner similar to Example 1, except that the materials used were changed as shown in Table 1.

Example 3

Materials shown in Table 1 were used to form a fire stopper. A fire extinguishing agent-containing layer was formed by preparing a slurry containing the fire extinguishing agent and a binder, and applying it on a substrate. The fire extinguishing agent-containing layer and the additional substrate were joined together using an adhesive layer.

Example 4 and 5

A fire stopper was produced in a manner similar to Example 3, except that the materials used were changed as shown in Table 1.

Comparative Example 1

A fire stopper was produced in a manner similar to Example 1, except that the materials used were changed as shown in Table 1.

Comparative Example 2

A fire stopper was produced in a manner similar to Example 3, except that the materials used were changed as shown in Table 1.

The following evaluations were performed on each example of the fire stoppers. The results are shown in Table 1.
<Water Vapor Permeability>
The respective water vapor permeability of the substrate and the additional substrate was measured. The measurement was carried out under conditions of 40° C./90% RH according to JIS K 7129. The water vapor permeability was evaluated according to the following criteria.
  A: water vapor permeability was $2\times10^2$ g/m$^2$/day or less.
  B: water vapor permeability was more than $2\times10^2$ g/m$^2$/day.
<Property Stability Evaluation of Fire Extinguishing Agent>
In Examples 1, 2, and Comparative Example 1, the fire extinguishing agent-containing layer side of the obtained fire stopper was attached to a stainless steel plate (SUS 304) using a sealer to make a test specimen. For the other Examples and Comparative Examples, the obtained fire stoppers were used as test specimens. The specimens in the Examples were left under conditions of 40° C./90% RH for 7 days. Then, the property stability of the fire extinguishing agent was evaluated based on the following criteria.
  A: No change was seen in the appearance of the fire stopper.
  B: A change (such as discoloration or swelling of the fire extinguishing agent-containing layer) in the appearance of the fire stopper was seen.

TABLE 1

| | Configuration | | | | | | | Evaluation | |
|---|---|---|---|---|---|---|---|---|---|
| | Substrate | | Fire extinguishing agent-containing layer | Additional substrate | | Total | | Water vapor | |
| | Material | Thickness (μm) | Thickness (μm) | Material | Thickness (μm) | thickness (μm) | Remarks | permeability of substrate | Property stability |
| Example 1 | PVC | 100 | 50 | — | — | 150 | Attached to stainless steel plate | A | A |
| Example 2 | LLDPE | 100 | 50 | — | — | 150 | Attached to stainless steel plate | A | A |

TABLE 1-continued

| | | Configuration | | | | | Evaluation | |
| | | Fire extinguishing | | | | | | |
| Substrate | | agent-containing | Additional | | Total | | Water vapor | |
| Material | Thickness (μm) | layer Thickness (μm) | substrate Material | Thickness (μm) | thickness (μm) | Remarks | permeability of substrate | Property stability |
|---|---|---|---|---|---|---|---|---|
| Example 3 | LLDPE | 50 | 50 | LLDPE | 50 | 150 | — | A | A |
| Example 4 | LDPE | 50 | 50 | LDPE | 50 | 150 | — | A | A |
| Example 5 | LDPE | 25 | 100 | LDPE | 25 | 150 | — | A | A |
| Comparative Example 1 | Paper | 250 | 50 | — | — | 300 | Attached to stainless steel plate | B | B |
| Comparative Example 2 | Paper | 250 | 50 | Paper | 250 | 550 | — | B | B |

Since the fire stopper according to the Examples is provided with a resin substrate, it has improved or even excellent handling, and deterioration of the fire extinguishing agent over time was suppressed. The provision of such a fire stopper in the vicinity of the object in advance provides prevention of the occurrence or spread of a fire caused by ignition of the object.

INDUSTRIAL APPLICABILITY

The fire stopper of the present invention can be suitably used especially for components used in industrial materials such as construction materials, automobile components, aircraft components, and electronics components.

REFERENCE SIGNS LIST

1 . . . Fire extinguishing agent-containing layer; 2 . . . Resin substrate; 3 . . . Additional resin substrate (sealing substrate); 4 . . . Adhesive layer; 5 . . . Sealing portion; 6 . . . Sticky layer; 7 . . . Release film; 8 . . . Design layer; 10, 20, 30, 40, 50, 60 . . . Fire stopper; X . . . Target.

What is claimed is:

1. A fire stopper, comprising:
a first resin substrate,
a fire extinguishing agent-containing layer comprising a fire extinguishing agent and a binder resin;
a second resin substrate; and
sealing portions, wherein:
    the fire extinguishing agent-containing layer is positioned between is between the first resin substrate and the second resin substrate; and
    peripheral edges of the first resin substrate and the second resin substrate are joined by the sealing portions, thereby sealing the fire extinguishing agent-containing layer.

2. The fire stopper of claim 1, wherein each of the first resin substrate and the second resin substrate comprises at least one selected from a group consisting of polyolefin, polyester, fluororesin, PVC, PVA, acrylic resin, epoxy resin, polyamide, and polyimide.

3. The fire stopper of claim 1, wherein each of the first resin substrate and the second resin substrate has a thickness of 4.5 to 1000 μm.

4. The fire stopper of claim 1, wherein a water vapor permeability of the second resin substrate (under conditions of 40° C./90% RH according to JIS K 7129) is $2\times10^2$ g/m²/day or less.

5. The fire stopper of claim 1, further comprising a first adhesive layer in direct physical contact with each of the fire extinguishing agent-containing layer and the first resin substrate.

6. The fire stopper of claim 5, further comprising a second adhesive layer in direct physical contact with each of the fire extinguishing agent-containing layer and the second resin substrate.

7. The first stopper of claim 1, wherein each of the first resin substrate of the second resin substrate consists of PVC, LLDPE or LLPE, a thickness of each of the first resin substrate of the second resin substrate is from 25 μm to 50 μm and a thickness of the fire extinguishing agent-containing layer is from 50 μm to 100 μm.

8. The fire stopper of claim 7, wherein the sealing portions comprise an ultraviolet curable sealing material.

9. The fire stopper of claim 1, wherein the sealing portions comprise an ultraviolet curable sealing material.

10. The fire stopper of claim 5, wherein the first adhesive layer has a thickness from 2 to 5 μm.

11. The fire stopper of claim 1, wherein each of the first resin substrate and the second resin substrate consists of a thermoplastic resin.

12. The fire stopper of claim 1, wherein the fire extinguishing agent-containing layer has a surface area smaller than a surface area of the first resin substrate and a surface area of the second resin substrate.

13. The fire stopper of claim 1, wherein each of the first resin substrate and the second resin substrate consists of polyolefin, a thickness of each of the first resin substrate of the second resin substrate is from 25 μm to 50 μm and a thickness of the fire extinguishing agent-containing layer is from 50 μm to 100 μm.

14. The fire stopper of claim 13, wherein the sealing portions comprise an ultraviolet curable sealing material.

15. The fire stopper of claim 5, wherein each of the first resin substrate and the second resin substrate consists of polyolefin, a thickness of each of the first resin substrate of the second resin substrate is from 25 μm to 50 μm and a thickness of the fire extinguishing agent-containing layer is from 50 μm to 100 μm.

16. The fire stopper of claim 15, wherein the sealing portions comprise an ultraviolet curable sealing material.

17. The fire stopper of claim 16, wherein the first adhesive layer has a thickness from 2 to 5 μm.

* * * * *